(12) United States Patent
McCadie

(10) Patent No.: US 11,174,970 B1
(45) Date of Patent: Nov. 16, 2021

(54) HOSE CLAMP APPARATUS

(71) Applicant: Brian James McCadie, Islamorada, FL (US)

(72) Inventor: Brian James McCadie, Islamorada, FL (US)

( * ) Notice: Subject to any disclaimer, the term of this patent is extended or adjusted under 35 U.S.C. 154(b) by 231 days.

(21) Appl. No.: 16/684,904

(22) Filed: Nov. 15, 2019

(51) Int. Cl.
*F16L 21/06* (2006.01)

(52) U.S. Cl.
CPC .................. *F16L 21/065* (2013.01)

(58) Field of Classification Search
CPC ....... F16L 21/065; F16L 33/08; F16L 33/085; F16L 33/10; Y10T 24/1441; Y10T 24/1443
USPC .................. 285/114, 420, 252, 253
See application file for complete search history.

(56) References Cited

U.S. PATENT DOCUMENTS 5,368,337 A * 11/1994 Torres ..................... F16L 33/02
285/114

* cited by examiner

*Primary Examiner* — Aaron M Dunwoody
(74) *Attorney, Agent, or Firm* — Gulf Coast Intellectual Property Group

(57) ABSTRACT

A hose clamp apparatus that is configured to provide operable coupling with a second hose clamp apparatus so as to maintain an adjacent position with each other on a hose. The hose clamp apparatus of the present invention includes a band member operably coupled to an adjustment mechanism disposed within a housing. The housing includes a first side and a second side. Mounted to the first side of the housing is a first keeper. Secured to the second side of the housing is a second keeper. The first keeper and second keeper are configured to be mateably coupled so as to operably couple a first hose clamp apparatus with a second hose clamp apparatus. The first keeper and second keeper each have a first portion that extends outward from the housing. Engagement members are located at opposing ends of the housing and are operably coupled to the adjustment mechanism.

13 Claims, 2 Drawing Sheets

HOSE CLAMP APPARATUS

FIELD OF INVENTION

The present invention relates generally to fasteners, more specifically but not by way of limitation, a hose clamp apparatus that is operable to secure hoses in fields such as but not limited to automotive and marine wherein the hose clamp apparatus is configured to facilitate releasable connection of more than one hose clamp so as to position hose clamps adjacent to each other on a desired hose.

BACKGROUND

As is known in the art, hose clamps are commonly utilized in various applications to secure hoses and fittings. Hose clamps are deployed in many disciplines wherein distribution of fluids occurs such as but not limited to automotive, marine and aviation. The aforementioned disciplines utilize combustible engines and as such require distribution and transfer of fluids such as but not limited to oil, gas and water. Conventional hose clamps are utilized on various hoses that are configured to transfer the required fluids for operation of the combustible engine. Hoses are typically utilized for fluids such as but not limited to fuel and coolant liquid. These hoses are secured to the required connectors with conventional hose clamps. As is known in the art, conventional hose clamps include a portion that are circumferentially disposed on the house and the diameter thereof is adjusted in order to provide securing of the hose clamp in the desired position wherein the hose clamp provides a distributed clamping force that is generally even around the circumference of the hose.

One issue with conventional hose clamps is their inability to be operably coupled to additional hose clamps for applications that require, or it is recommended, that more than one hose clamp be utilized to secure a hose. By way of example but not limitation, it is often required or recommended that fuel lines on marine vessels utilize two clamps to operably couple a hose end to a connector. Currently this requires the placement of two separate hose clamps on the hose and as such each separate hose clamp is independently manipulated into the desired position. Manipulation of separate hose clamps in restricted areas or in general can be difficult. The desired adjacent placement of dual hose clamp configurations is cumbersome and can often be executed wherein the adjacent hose clamps may not be in a desired adjacent position with appropriate spacing therebetween.

It is intended within the scope of the present invention to a hose clamp apparatus that is configured to facilitate the mateable connection with an additional hose clamp so as to provide an efficient technique for deploying a hose clamp system that utilizes two hose clamps to secure an end of a hose.

SUMMARY OF THE INVENTION

It is the object of the present invention to provide a hose clamp apparatus that is operable to provide a technique to releasably secure two hose clamps together wherein the hose clamp apparatus of the present invention includes a clamp member.

Another object of the present invention is to provide a hose clamp apparatus that is configured to create a hose clamp system operable to deploy adjacent hose clamps for securing of an end of a hose wherein the hose clamp apparatus includes a housing.

A further object of the present invention is to provide a hose clamp apparatus that is operable to provide a technique to releasably secure two hose clamps together that further includes an adjustment mechanism disposed within the housing.

Still another object of the present invention is to provide a hose clamp apparatus that is configured to create a hose clamp system operable to deploy adjacent hose clamps for securing of an end of a hose wherein the housing includes a first side and a second side.

An additional object of the present invention is to provide a hose clamp apparatus that is operable to provide a technique to releasably secure two hose clamps together wherein the present invention includes a first keeper formed on the first side of the housing.

Yet a further object of the present invention is to provide a hose clamp apparatus that is configured to create a hose clamp system operable to deploy adjacent hose clamps for securing of an end of a hose wherein the second side of the housing has a second keeper formed thereon.

Another object of the present invention is to a provide a hose clamp apparatus that is operable to provide a technique to releasably secure two hose clamps together wherein the first keeper and second keeper are configured to be mateably secured.

An alternate object of the present invention is to provide a hose clamp apparatus that is configured to create a hose clamp system operable to deploy adjacent hose clamps for securing of an end of a hose wherein the fastening mechanism includes a first engagement member and a second engagement member disposed on opposing ends of the housing.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
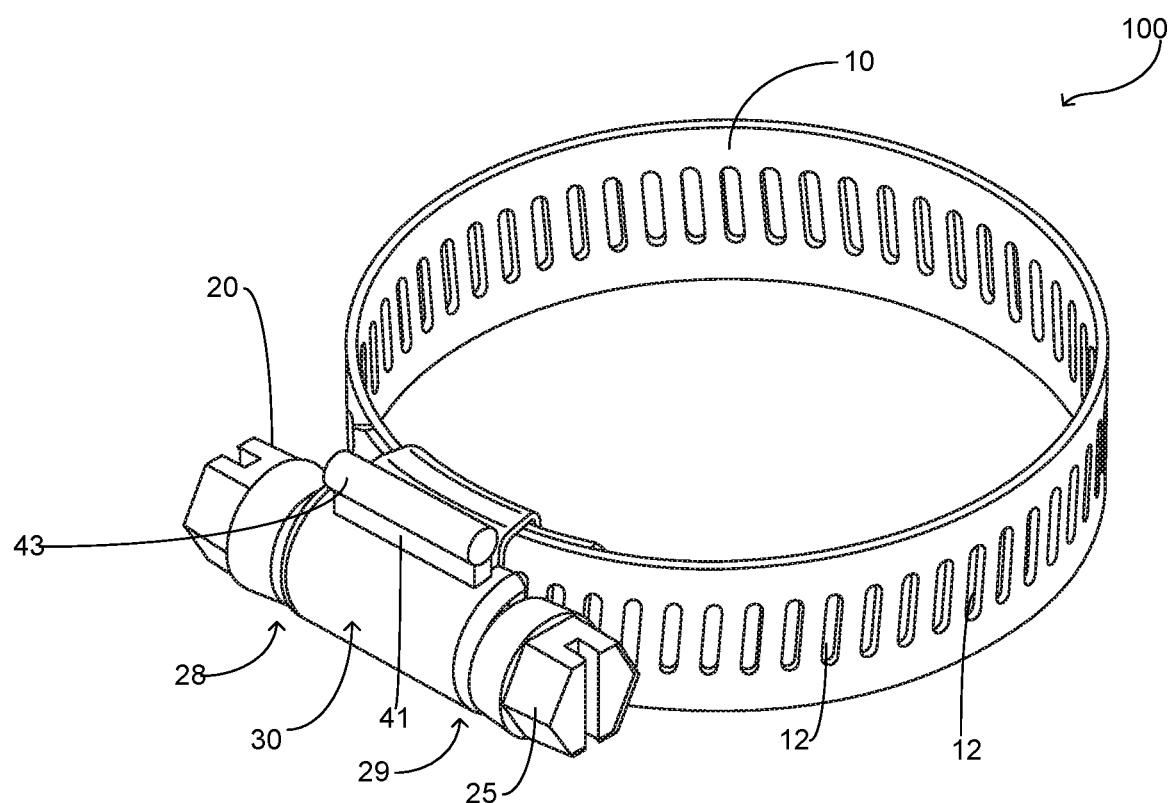
FIG. 1 is a first side perspective view of the present invention.
Figure 2:
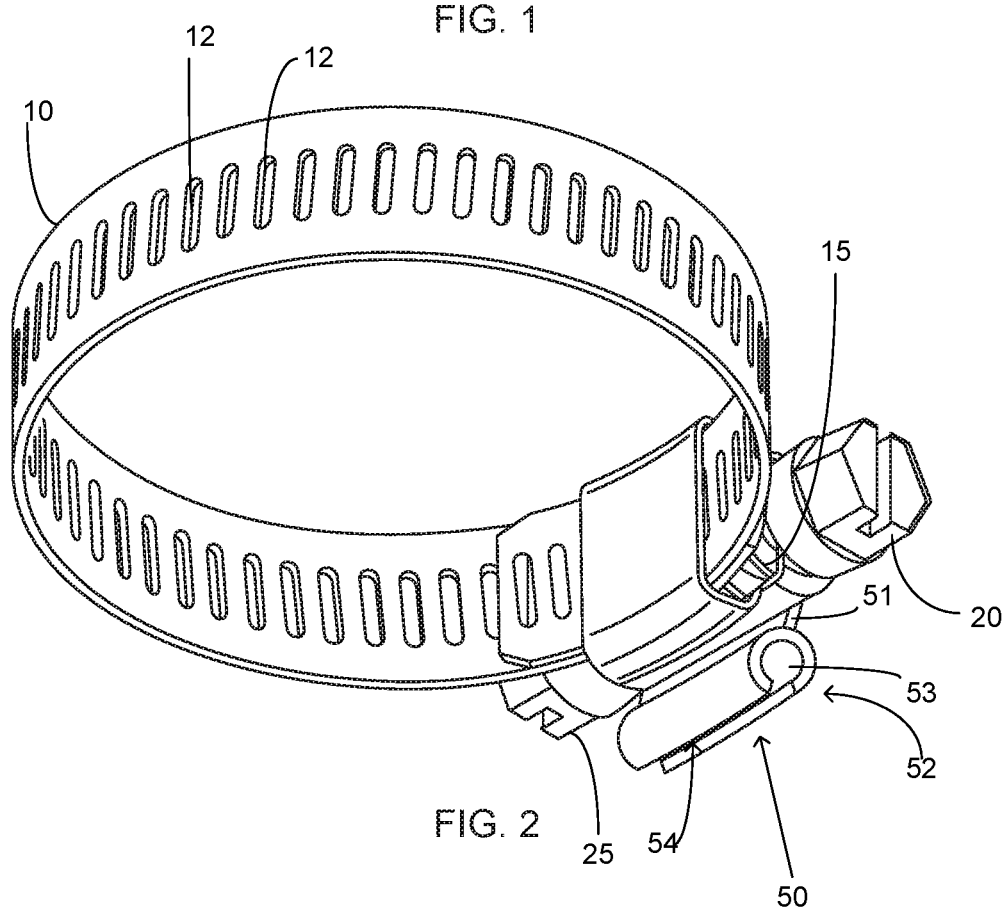
FIG. 2 is second side perspective of the present invention.
Figure 3:
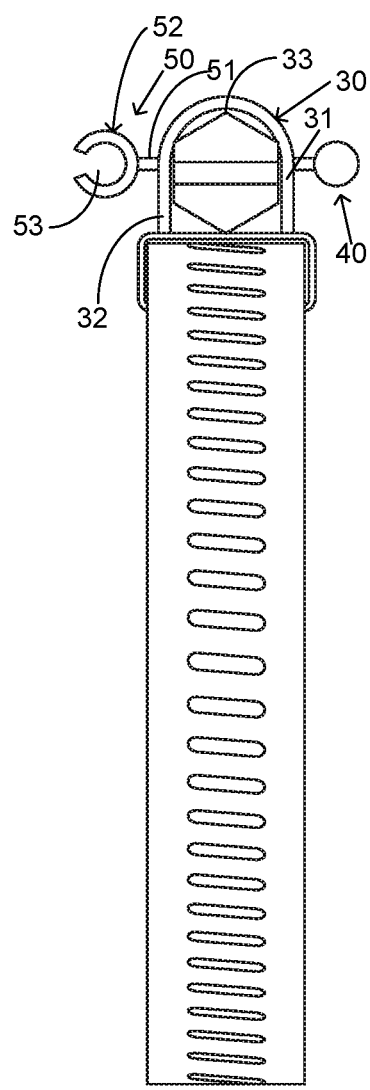
FIG. 3 is an end view of the present invention.

Referring now to the drawings submitted herewith, wherein various elements depicted therein are not necessarily drawn to scale and wherein through the views and figures like elements are referenced with identical reference numerals, there is illustrated a hose clamp apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the hose clamp apparatus 100 includes a band member 10 that is planar in manner and rounded in form. The band member 10 is rounded in form so as to mateably accommodate a hose and is manufactured from suitable durable materials such as but not limited to metal. The band member 10 can be provided in various diameters in order to accommodate hoses of alternate sizes. The band member 10 includes a plurality of apertures 12 formed therein. The apertures 12 are disposed substantially along the entire length of the band member 10. It is contemplated within the scope of the present invention that the band member 10 could have various quantities of apertures 12 or be formed without apertures 12 and engage the adjustment mechanism 15 utilizing other techniques. The apertures 12 are operable to engage an adjustment mechanism 15 disposed within the interior volume of the housing 30. The adjustment mechanism 15 is a conventional worm gear wherein the rotational movement thereof will either reduce or expand the diameter of the band member 10. While the hose clamp apparatus 100 utilizes a conventional worm gear for the adjustment mechanism 15 it is contemplated within the scope of the present invention that the band member 10 could be operated utilizing alternate elements in addition to or in conjunction with the worm gear 15. The adjustment mechanism 15 is operably coupled to a first engagement member 20 and a second engagement member 25. The first engagement member 20 and second engagement member 25 provide an interface for a user to rotate the adjustment mechanism 15. In a preferred embodiment the first engagement member 20 and second engagement member 25 are hex nuts having a slot so as to facilitate engagement with either a screwdriver or nut driver. It should be understood within the scope of the present invention that the first engagement member 20 and second engagement member 25 could be formed in alternate manners so as to provide a technique for a user to operably engage the adjustment mechanism 15. Furthermore, it should be understood within the scope of the present invention, that while a first engagement member 20 and second engagement member 25 are disclosed and discussed herein in the preferred embodiment, the present invention could be provided with only one engagement member or more than two engagement members configured to provide operational interface of the adjustment mechanism 15.

The hose clamp apparatus 100 includes a housing 30. The housing 30 is manufactured from a suitable durable material such as but not limited to metal and has an interior volume configured to have the adjustment mechanism 15 disposed therein. The housing 30 includes a first side 31, a second side 32 and a top surface 33 that are contiguously formed to create the shape of the housing 30. While the housing 30 is illustrated herein as having a particular shape, it is contemplated within the scope of the present invention that the housing 30 could be formed in various alternate shapes and sizes. Formed on the first side 31 is a first keeper 40. First keeper 40 is secured to the first side 31 utilizing suitable durable techniques. The first keeper 40 is substantially the length of the housing 30 extending intermediate the ends 28, 29 thereof. While in a preferred embodiment the first keeper 40 is substantially the length of the housing 30, it should be understood within the scope of the present invention that the first keeper 40 could be provided in alternate sizes. The first keeper 40 includes a first portion 41 and a second portion 43 that are contiguously formed. The first portion 41 extends outward from the first side 31 of the housing 30 and is generally perpendicular thereto. The first portion 41 is generally flat and planar in manner. It is contemplated within the scope of the present invention that the first portion 41 could extend outward from the first side 31 of the housing 30 in varying distances. Contiguously formed with the first portion 41 distal to the first side 31 is the second portion 43. The second portion 43 is formed in a cylindrical shape so as to mateably engage the second keeper 50 as will be further discussed herein. It should be understood within the scope of the present invention that the second portion 43 could be provided in various alternate shapes and sizes in order to facilitate the mateable coupling with the second keeper 50. The second portion 43 is configured to slidably engage the second keeper 50 in order to couple and maintain two hose clamp apparatus 100 in an adjacent position and operably engaged with a hose.

The second keeper 50 is secured to the second side 32 of the housing 30 utilizing suitable durable techniques. The second keeper 50 is configured to mateably couple with the first keeper 40 present on a separate hose clamp apparatus 100 so as to join two hose clamp apparatus 100. The second keeper 50 extends substantially the length of the housing 30 and includes a first portion 51 and second portion 52. While the second keeper 50 is illustrated in a preferred embodiment herein, it is contemplated within the scope of the present invention that the second keeper 50 could be provided in alternate sizes and shapes in order to achieve the desired functionality described herein. The first portion 51 of the second keeper 50 is generally flat and planar in manner being perpendicular to the second side 32 of the housing 30. Secured to the first portion 51 distal to the second side 32 is the second portion 52. The second portion 52 is arcuate in form having a passage 53 that is of a mateable diameter to accommodate the second portion 43 of the first keeper 40. The second portion 52 includes opening 54 that extends the length of the second portion 52 and is configured to receive the first portion 41 of the first keeper 40 as the first keeper 40 and second keeper 50 are slidably engaged. The aforementioned configuration provides a securing of a first hose clamp apparatus 100 and with a second hose clamp apparatus 100 creating a hose clamp system that is useful in applications where it is desirable to utilize two hose clamps to secure a hose.

While the hose clamp apparatus 100 is illustrated herein as having a first keeper 40 and a second keeper 50 formed on the first side 31 and second side 32 of the housing 30, it should be understood within the scope of the present invention that the hose clamp apparatus 100 could be provided with only a first keeper 40 wherein the first keeper 40 would be configured to mateably couple with the shape of the housing 30 of the hose clamp apparatus 100.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A hose clamp apparatus configured to secure a hose to a connection wherein the hose clamp apparatus comprises:
    a band member, said band member being circular in form;
    a housing, said housing having an interior volume, said housing configured to have an adjustment mechanism disposed in said interior volume, said adjustment mechanism operably coupled with said band member, said housing having a first side and a second side, said housing having a first end and a second end;
    a first keeper, said first keeper being secured to said housing, said first keeper being configured to operably couple with a second housing present on a second hose clamp apparatus; and
    wherein the first keeper is operable to maintain the hose clamp apparatus and the second hose clamp apparatus in an adjacent position; and
    a second keeper, said second keeper being formed on said housing of the hose clamp apparatus, said second keeper being present on said housing on an opposing side as said first keeper.

2. The hose clamp apparatus as recited in claim 1, wherein said first keeper and said second keeper are configured to be mateably coupled in order to operably connect the hose clamp apparatus with the second hose clamp apparatus.

3. The hose clamp apparatus as recited in claim 2, and further including at least one engagement member, said at least one engagement member operably coupled with said adjustment mechanism, said at least one engagement member providing an interface to operate said adjustment mechanism.

4. A hose clamp system that is configured to couple a first hose clamp apparatus and a second clamp apparatus so as to be adjacent on a hose wherein the hose clamp system comprises:
    a hose clamp apparatus, said hose clamp apparatus including a band member, said band member being circular in form, said band member being planar and having a plurality of apertures formed therein;
    a housing, said housing having a first end and a second end, said housing having a first side, a second side and a top surface contiguously formed to create an interior volume, said housing having an adjustment mechanism, said adjustment mechanism operably coupled with said band member and configured to provide adjustment in a size thereof;
    a first keeper, said first keeper being formed on said first side of the housing;
    a second keeper, said second keeper being formed on said second side of said housing; and
    wherein the first keeper and second keeper are configured to be mateably coupled in order to join the first hose clamp apparatus and the second hose clamp apparatus and maintain the first hose clamp apparatus and the second hose clamp apparatus in an adjacent position.

5. The hose clamp system as recited in claim 4, and further including a first engagement member, said first engagement member being located at the first end of said housing, said first engagement member being operably coupled to said adjustment mechanism.

6. The hose clamp system as recited in claim 5, and further including a second engagement member, said second engagement member being located at the second end of said housing, said second engagement member being operably coupled to said adjustment mechanism.

7. The hose clamp system as recited in claim 6, wherein said first keeper further includes a first portion and a second portion, said first portion and said second portion of said first keeper being contiguously formed, said first portion of said first keeper being secured to said first side of said housing.

8. The hose clamp system as recited in claim 7, wherein said second keeper further includes a first portion and a second portion, said first portion and said second portion of said second keeper being contiguous, said second portion of said second keeper configured to mateably connect with said second portion of said first keeper.

9. A hose clamp apparatus comprising:
    a band member, said band member being circular in form, said band member being planar and having a plurality of apertures formed therein;
    a housing, said housing having a first end and a second end, said housing having a first side, a second side and a top surface contiguously formed to create an interior volume, said housing having an adjustment mechanism, said adjustment mechanism being disposed within the interior volume of said housing, said adjustment mechanism operably coupled with said plurality of apertures of said band member, said adjustment mechanism configured to provide adjustment in a size thereof;
    a first keeper, said first keeper being formed on said first side of the housing, said first keeper having a first portion and a second portion, said first portion being secured to said first side of said housing, said first portion extending outward from said first side of said housing;
    a second keeper, said second keeper being formed on said second side of said housing, said second keeper having a first portion and a second portion, said first portion and said second portion of said second keeper being contiguous, said second portion of said second keeper configured to mateably couple with said second portion of said first keeper; and wherein the first keeper and second keeper are configured to be mateably coupled in order to join a first hose clamp apparatus with a second hose clamp apparatus and maintain the first hose clamp apparatus and the second hose clamp apparatus in an adjacent position on a hose.

10. The hose clamp apparatus as recited in claim 9, wherein the first portion of the first keeper is planar in manner and extends outward from said first side of said housing.

11. The hose clamp apparatus as recited in claim 10, wherein said second portion of said first keeper is cylindrical in shape and is equal in length with the first portion.

12. The hose clamp apparatus as recited in claim 11, wherein said first portion of said second keeper is perpendicular with said second side of said housing and extends outward therefrom.

13. The hose clamp apparatus as recited in claim 12, wherein said second portion of said second keeper is c-shaped.

\* \* \* \* \*